United States Patent [19]

Schafer et al.

[11] 3,812,234
[45] May 21, 1974

[54] PROCESS FOR THE PRODUCTION OF ALKALI-CHROMATE

[75] Inventors: Heinrich Schafer, Opladen; Hans Georg Nieder-Vahrenholz, Cologne, both of Germany

[73] Assignee: Bayer Aktiengesellschaft, Leverkusen, Germany

[22] Filed: Feb. 9, 1972

[21] Appl. No.: 224,980

Related U.S. Application Data

[63] Continuation of Ser. No. 38,426, May 18, 1970, abandoned.

[30] Foreign Application Priority Data

May 24, 1969 Germany.................. 1926660

[52] U.S. Cl. .................................................. 423/61
[51] Int. Cl............................................. C01g 37/00
[58] Field of Search................................ 423/53, 61

[56] References Cited
UNITED STATES PATENTS

| | | | |
|---|---|---|---|
| 901,436 | 10/1908 | Gibbs | 423/61 |
| 1,832,069 | 11/1931 | Wechter | 423/61 X |
| 1,866,648 | 7/1932 | Hackhoffer | 423/61 |
| 2,077,096 | 4/1937 | Carpenter et al. | 423/53 |
| 3,095,266 | 6/1963 | Sandes et al. | 423/53 |
| 3,510,256 | 5/1970 | Schafer | 423/61 |

*Primary Examiner*—Herbert T. Carter
*Attorney, Agent, or Firm*—Burgess, Dinklage & Sprung

[57] ABSTRACT

Process for the production of alkali chromate from chromium containing materials, e.g. chromium ore under oxidising conditions with alkali, e.g. sodium carbonate, sodium hydroxide, sodium hydrogen carbonate, potassium carbonate and the like optionally in the presence of the usual diluents, e.g. dolomite, iron oxide and/or recycled treatment residue previously recovered from the process at temperatures between about 900° and 1,200° C in directly heated furnaces, wherein the chromium containing material is initially heated under fluidising conditions in a separate heating zone bypassing countercurrent to the exhaust gases from the directly heated furnace to temperatures of from about 500° to 1,100° C.

7 Claims, 1 Drawing Figure

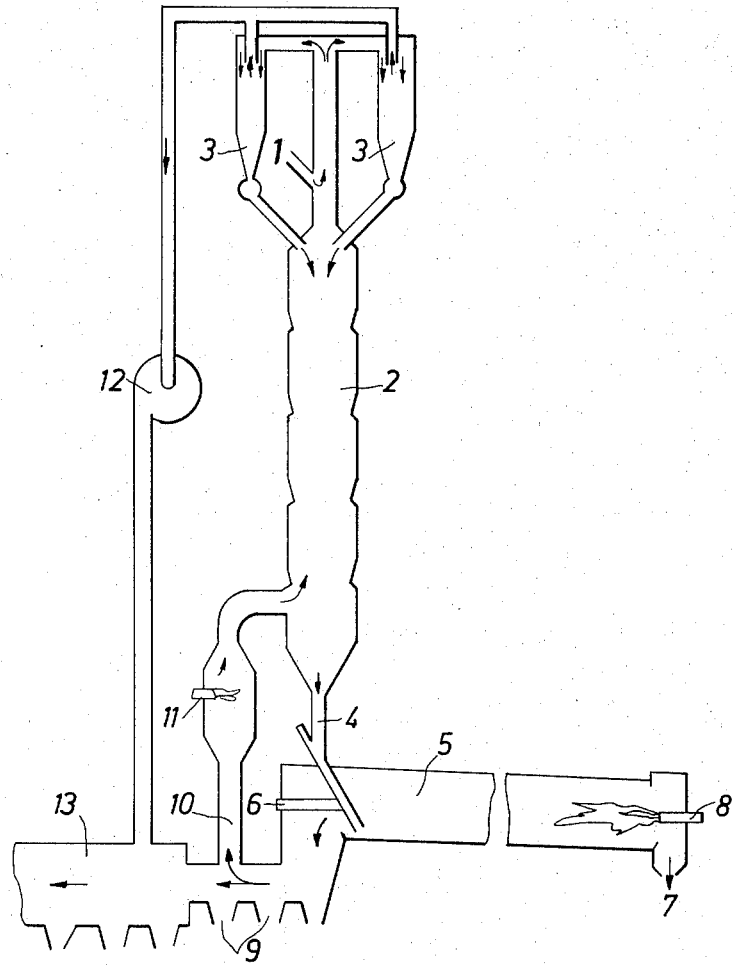

PROCESS FOR THE PRODUCTION OF ALKALI-CHROMATE

This is a continuation of U.S. application Ser. No. 38,426 filed May 18, 1970 now abandoned.

This invention relates to a process for the oxidising disintegration of materials containing chromium oxide in the presence of alkalis and optionally diluents.

It is known that a material containing chromium oxide can be disintegrated in the presence both of an alkali and of a diluent such as lime, magnesium oxide, iron oxide, lixiviated and dried furnace material, at a temperature of from about 900° to 1,200° C. Disintegration is generally carried out in rotary kilns and plate or annular furnaces, the material to be disintegrated normally being passed through the furnaces in countercurrent to hot oxygen-containing gases. The furnaces are preferably directly heated by the combustion of carbon-containing materials. Soda is generally used as the alkali either in a stoichiometric quantity or even in a deficit or an excess, based on the material containing chromium oxide to be disintegrated.

Chromium ore/alkali mixtures have the draw-back that they agglomerate when heated to an elevated temperature. The object of several processes proposed in the literature is to obviate the agglomeration which prevents both the alkali and the oxygen from reaching the chromium ore particles with the result that the chromium ore cannot be completely converted into alkali metal chromate.

In one known process, the materials containing chromium ore are initially mixed with inert materials (leaning agents) and soda and the resulting mixture is converted into granules. The properties of the granules with regard to pressure resistance and porosity are so adjusted that disintegration is substantially quantitative and no difficulties are encountered in the subsequent leaching of the disintegrated material. In other known processes, no significance is attached to quantitative disintegration of the chromium ore in a single operation. In the first process stage, the chromium ore is disintegrated with a deficit of alkali, some of the chromium ore being used as a diluent. After the disintegrated material has been leached, any solid material which has not been disintegrated is used as the so-called recycle material for a second disintegration. In this second stage, freshly ground ore and the recycle material are mixed together and disintegrated with the stoichiometrically necessary quantity of alkali. Substantially quantitative disintegration of the chromium oxide present is obtained in this second stage.

Since increasing quantities of sodium hydroxide accumulate with increasing chlorine output and have to be economically utilised, there is considerable interest in using sodium hydroxide at least in part in industrial processes in which soda has hitherto been used.

Basically, processes for the disintegration of chromium ores with alkali metal hydroxides have been known for some considerable time. The so-called Bitterfelder process was introduced for example to avoid the high temperatures necesssary where soda is used as the alkali. In the Bitterfelder process, the disintegration of chromium ore is carried out at a low temperature of around 500° C with potassium hydroxide solution. A mash of chromium ore and potassium hydroxide solution is sprayed into a rotary kiln heated with a hydrogen flame. Direct heating with carbon containing fuels is not possible because the $CO_2$ formed would immediately form potassium carbonate with the potassium hydroxide and the required effect, i.e., avoiding high disintegration temperatures, would not be obtained. The Bitterfelder process can only be carried out economically in cases where hydrogen as well as potassium hydroxide solutions are available in sufficient quantities. Accordingly, it has not acquired any general significance in industry. Attempts to replace the potassium hydroxide with sodium hydroxide liquors have failed. The same applies as regards processes which, through using sodium hydroxide, work with indirect heating. In the process disclosed in German Pat. Specification No. 163,814, chrome iron ore for example is disintegrated in the presence of a substance which gives off oxygen, such as for example pryolusite or iron-, lead-or copper oxide, at temperatures of from 500° to 600° C in a melt of sodium hydroxide. In a modification of this process disclosed in German Pat. Specification No. 171,089, the oxidising substances can be replaced by air, in which case the air is blown into the melt in finely divided form.

An industrially and economically workable process for the disintegration of chromium ores with sodium hydroxide liquors is described in French Pat. Specification No. 1,531,069. In this process, the chrome-containing materials, optionally following introduction of the usual additives, i.e., diluents are heated to a temperature above 500° C preferably in a rotary kiln, and are then intimately mixed with sodium hydroxide solutions or molten sodium hydroxide. The heating is thereby continued until the mixture reaches temperatures of from 900° to 1,200° C. Unfortunately, this known process involves some difficulties as the NaOH-solution has to be fed into the furnace in ultrafinely divided form under the prevailing conditions. Unless it is uniformly added, the caustic soda agglomerates and forms deposits, adversely affecting disintegration. In the usual disintegration process carried out with soda in rotary kilns, approximately half to two thirds of the entire length of the oven is required to heat the material to be disintegrated to the necessary temperature. It is therefore understandable that the efficiency of the furnace is reduced by the caustic soda introduced. In order to obtain an equal level of disintegration, to compensate for the increased energy requirement resulting from the introduction of caustic soda the throughput of material must be decreased.

A process for the production of alkali-chromate by disintegrating materials containing chromium oxide in the presence of alkali and optionally in the presence of a diluent at temperatures of from 900° to 1,200° C under direct heat transfer has now been found in which the material is initially preheated in fluidised state with exhaust gases from disintegration by passing countercurrent thereto at a temperature of from 500° to 1,100° C in a separate preheating zone.

Surprisingly, the starting mixture containing chrome ore can be preheated to a very high temperature under the conditions according to the invention without any signs of agglomeration. Even when the material to be disintegrated is mixed with sodium or potassium hydroxide solution no difficulties are encountered. Since the heating of the material in the furnace itself is reduced to a minimum, the volume-time yields of the process are considerably increased.

Another advantage of the new process is that the specific fuel consumption is considerably lower than in other disintegration processes with the result that a considerably higher concentration of oxygen than usual is present in the reaction zone. This is of significance insofar as the reaction velocity increases with increasing oxygen partial pressure, thus promoting chromate formation and considerably increasing the throughout of existing furnaces.

Although all the advantages of the process are prevalent in cases where alkali hydroxide solutions are used, the novel process may also be used with advantage in case an alkali metal carbonate is employed.

All the alkali required for disintegration may be introduced in the form of an alkali metal hydroxide and preferably in the form of an aqueous solution. It is also possible, however, and sometimes preferred to replace only a portion of the soda employed in the usual way by e.g. sodium hydroxide or its aqueous solution.

The NaOH-solution is used in a concentration of from at least 30 percent by weight and preferably in a concentration of from 40 to 60 percent by weight. It is of advantage not to use liquors of a lower concentration in order to avoid the introduction of an excessively large quantity of water. There is no upper limit to the concentration providing the liquor concentration is kept above its solidification point and hence remains pumpable. It is also possible, for example, to employ a sodium hydroxide melt. Instead of sodium also the corresponding potassium compounds such as the hydroxide and carbonate may be used.

The amount of the alkali required to carry out the reaction can be added to the material to be disintegrated either before, during or after heating in the heat-exchanger system. Alkali metal hydroxides are advantageously added to the material to be disintegrated after it has been preheated. The alkali metal hydroxide is sprayed on the material to be disintegrated in the first third of the reaction furnace in the finely divided form either as an aqueous solution or melt or alternatively it is mixed with the preheated material in a feed means for example in a heated mixing screw, before it is introduced into the furnace. The alkali metal hydroxide introduced is quickly converted by the furnace gases into the corresponding carbonate so that the material is prevented from sticking and caking when heated quickly to a temperature of 900° C. At temperatures around 1,000° C, the material to be disintegrated forms solid melt granules which enable the furnace to be satisfactorily operated.

Where alkali metal carbonates or bicarbonates are used, they may be added to the material to be heated. In this case, however, the temperature must be adjusted during heating so that the material to be disintegrated does not cake through melting or sintering. In cases where the alkalis are added to the material to be disintegrated after it has been preheated, which is of advantage in large-scale operation, disintegration is preferably carried out in a rotary kiln. In this case, the rotary kiln simultaneously acts as a mixer. The rotary kilns are internally heated in the usual way with carbon-containing fuel such as gas, oil and/or coal dust moving either in the same direction as or countercurrent to the material being processed. As is already known from the art, disintegration may be carried out in a single stage or in several stages using the usual diluents such as dolomite, iron oxide or disintegration residues (recycle material) from the lixiviation stage. The quantity of alkali to be added has to be adapted to the particular method of disintegration applied. It is possible to use an excess, a deficit or a stoichiometric quantity of alkali, based on the amount of chromium ore used. The disintegrated material is leached, filtered and the filtrate further processed into chromate, dichromate or chromic acid. Suitably modified, the process may also be carried out in plate or annular furnaces.

To heat the material to be disintegrated, the exhaust furnace gases are passed at least in part through a heat-exchanger system of the kind known from the cement industry for example countercurrent to the material to be heated. The heat exchanger system consists of a heat exchanger and one or more cyclone separators arranged to follow it. The material to be disintegrated is delivered between the heat exchanger and the cyclone separators and carried by the gas stream into the cyclone separators. The material to be disintegrated which is separated here introduced into the heat section of the heat exchanger and drops countercurrent to the gas stream into the lower sections of the exchanger until it reaches the bottom section. The hot material to be disintegrated then passes through a down pipe into the reaction furnace. As already mentioned, the material to be disintegrated may also be delivered into the reaction furnace by feed means such as for example heated or unheated screws. The exhaust gas from the furnace is drawn through the heat exchanger system by means of a fan and may optionally be additionally heated by heating means. It enters the bottom section of the exchanger, flows through the exchanger in countercurrent to the material to be preheated and leaves the system through the cyclone separators.

The residence time of the particles to be preheated in the heat exchanger can be adjusted on the one hand by adjusting the rate of flow and on the other hand by the geometry of the exchanger. The exchanger may be designed for example in the form of vertically adjacent cyclone separators or in the form of a vertically arranged tube with several successive tapered and widened zones. On the other hand, the crude material containing chromium ore may be also be heated in a fluidised bed. Suitable apparatus are described for example in German Offenlegungsschriften Pat. Nos. 1,442,766 and 1,442,782.

In a preferred embodiment of the process according to the invention, the exhaust gases which normally leave the rotary kiln at temperatures of from about 600° to 700° C are additionally heated to 700° to 1,300° C before they enter the exchanger system. In this way, it is possible actually to heat the material to be preheated to the reaction temperature before it is delivered into the furnace so that the reaction can begin without delay when the necessary alkali is introduced into the furnace.

Where the exhaust furnace gases have an inlet temperature of from 600° to 1,300° C, optionally obtained through the additional heating of the exhaust furnace gases, and the material to be disintegrated has an inlet temperature of from 20° to 30° C, a gas outlet temperature of from 200° to 500° C and an outlet temperature of the material to be disintegrated of from 500° to 1,100° C are obtained, depending upon the residence time of the material in the exchanger and the gas inlet temperature.

The formation of relatively large aggregates must be avoided during heating of the particles. Accordingly, it is preferred to operate with rates of gas flow above the fluidisation rate of the particles, but with high particle concentrations so that clouds of particles moving countercurrent to the gas stream are formed. Gas loads of from about 0.9 to 1.5 kg per kg of gas have proved to be effective. Cloud-formation of the particles is promoted by cross-sectional changes in the exchanger tube. However, there are other ways of heating the crude material, such as for example operating in a normal fluidised bed with gas rates of flow between the loosening rate and the fluidisation rate. In this case, the fluidised bed unit may be provided with a grid and a lateral outlet for the heated material.

One possible embodiment of the process according to the invention is described hereinafter with reference to the accompanying drawing which is a schematic sectional view through an apparatus for carrying out the invention. The crude material is introduced into the heat exchanger 2 at 1, carried upwards at least in part by the heating gases and returned to the exchanger through the cyclone separator 3. It then passes through the exchanger and is introduced at 4 into the rotary kiln 5 where it is mixed with the NaOH or soda introduced at 6. The melt leaves the furnace at 7. The oven is heated by the burner 8. The gases leaving the furnace are withdrawn by suction at 10 after coarse purification at 9 and, optionally after heating by the burner 11, are drawn into the heat exchanger. Following separation from the solid material in the cyclone 3, the gases are delivered through the fan 12 to a stream-recovery installation 13 and an electrostatic gas-purifier (EGR), not shown. The process according to the invention is illustrated by the following Examples:

EXAMPLE 1

A crude mixture of 100 parts of ground chromium ore containing 45.1 percent of $Cr_2O_3$, 170 parts of dried leaching residue containing 9.3 percent of $Cr_2O_3$ and 20 parts of iron oxide, is continuously introduced into the preheating system shown in the drawing. The exhaust gas from the rotary kiln heated to 1,200° C flows countercurrent to the crude mixture. The weight ratio of the material to be disintegrated to the exhaust gas is 0.9, the pressure drop in the heat-exchanger system is 100 mm water. The crude mixture leaves the heat exchanger at a temperature of 970° C and flows through a down pipe into one end of a rotary kiln fired at its other end with coal dust, whose combustion gases flow countercurrent to the ore. The exhaust gases leave the heat exchanger at a temperature of 420° C. From the material inlet side, a 50 percent aqueous NaOH-solution is poured on to the hot crude mixture through a tube projecting into the rotary kiln with a sprinkler. The quantity is such that 32 parts by weight of the sodium hydroxide solution are used to 100 parts of crude mixture. The temperature of the material in the reaction zone is 980° C and the exhaust furnace gas temperature is 810° C. The yield based on the chromium ore used is between 83 and 86 percent.

EXAMPLE 2

A mixture of 100 parts of chromium ore containing 45 percent of $Cr_2O_3$, 180 parts of leaching residue containing 9.0 percent of $Cr_2O_3$, 10 parts of iron oxide and 62 parts of soda is continuously introduced into the preheating system. The exhaust gas from the rotary kiln heated to 900° C flows countercurrent to the mixture. The weight ratio of the material to be disintegrated to the exhaust gas amounts to 1.05, the pressure drop in the heat exchanger is 130 mm water. The mixture leaves the exchanger at a temperature of 680° C and passes through a down pipe into the rotary kiln. The exhaust gas leaves the heat exchanger system at a temperature of 200° C. The temperature of the material in the reaction zone is 990° C, the exhaust furnace gas temperature is 760° C. The yield based on the chromium ore used is between 84 and 86 percent.

EXAMPLE 3

Disintegration is carried out in three stages: Chromium ore containing 45.0 percent of $Cr_2O_3$ is used in the first stage. The ratio by weight of the ore to the gas is 0.95. The gas enters the exchanger at a temperature of 1,230° C and leaves it at a temperature of 440° C. The material outlet temperature is 990° C. The ore is reacted with NaOH-solution in the rotary kiln as already described. There are used 38 parts by weight of a 50 percent NaOH-solution to 100 parts of the ore. The temperature of the material in the reaction zone is 970° C and the exhaust gas temperature 790° C. 32 to 33 percent of the chromium is recovered during leaching of the reaction product.

The leached and dried residue which contains an average of 33.5 percent of $Cr_2O_3$ is used in a second stage as diluent. The material-gas ratio is 0.95. The gas inlet temperature is 1,210° C and the gas outlet temperature 420° C. The material outlet temperature is 970° C. 30 parts by weight of 50 percent NaOH-solution are used to 100 parts of the residue. The material temperature in the reaction zone is 980° C and the exhaust furnace gas temperature 800° C. The $Cr_2O_3$ yield is from 41 to 42 percent.

The leaching residue of the second stage which has an average $Cr_2O_3$ content of 22 percent is mixed with iron oxide in a ratio of 10:2. The mixture-gas ratio is 1.0. The gas inlet temperature is 1,200° C, the outlet temperature 420° C and the material outlet temperature 960° C. 30 parts of a 50 percent NaOH-solution are added to the hot mixture in the furnace to 100 parts of the crude mixture. The temperature of the material in the reaction zone is 970° C, the exhaust furnace gas temperature is 790° C. The $Cr_2O_3$ yield is from 59 to 60 percent. The total yield over all three stages, based on the ore used, is from 83 to 84 percent.

It will be appreciated that the instant specification and examples are set forth by way of illustration and not limitation, and that various modifications and changes may be made without departing from the spirit and scope of the present invention.

What is claimed is:

1. In a process for the production of alkali chromate, wherein ground chromium containing material is preheated, mixed with alkali and with diluents and heated under oxidising conditions in directly heated zones to temperatures between about 900° and 1,200° C, and thereafter cooled and leached to recover in soluble form the disintegrated chromium oxide which is produced by such direct heating, the improvement in the preheating step which comprises initially preheating the ground chromium containing material in a separate heating zone to a temperature of 500° to 1,100° C by passage countercurrent to the exhaust gases from the directly heated zone, the gas load ranging from about 0.9 to 1.5 kg of chromium containing material per kg of gas, the chromium containing material dropping downwardly through successive zones of alternately larger and smaller cross-sectional areas so as to form clouds of particles alternating with denser masses of particles.

2. Improvement according to claim 1, wherein the exhaust gases are additionally heated to temperatures of from 700° to 1,300° C.

3. Improvement according to claim 1, wherein the alkali is a member selected from the group consisting of sodium hydroxide, sodium carbonate, sodium bicarbonate, potassium hydroxide, potassium carbonate, potassium bicarbonate.

4. Improvement according to claim 1, wherein the alkali is used in liquid form.

5. Improvement according to claim 1, wherein the alkali comprises sodium carbonate or bicarbonate and is added to the chromium containing material before the preheating so as to be preheated therewith.

6. Improvement according to claim 1, wherein the alkali comprises sodium hydroxide.

7. Improvement according to claim 1, wherein the preheating is carried out in a vertically arranged series of connected cyclone separators.

* * * * *